US011029392B2

(12) United States Patent
Colosimo

(10) Patent No.: US 11,029,392 B2
(45) Date of Patent: Jun. 8, 2021

(54) METHOD AND APPARATUS FOR COMPUTATIONAL GHOST IMAGING

(71) Applicant: BAE Systems plc, London (GB)

(72) Inventor: Nicholas Giacomo Robert Colosimo, Preston (GB)

(73) Assignee: BAE Systems plc, London (GB)

(*) Notice: Subject to any disclaimer, the term of this patent is extended or adjusted under 35 U.S.C. 154(b) by 912 days.

(21) Appl. No.: 15/564,455

(22) PCT Filed: Mar. 29, 2016

(86) PCT No.: PCT/GB2016/050873
§ 371 (c)(1),
(2) Date: Feb. 9, 2018

(87) PCT Pub. No.: WO2016/162664
PCT Pub. Date: Oct. 13, 2016

(65) Prior Publication Data
US 2018/0143303 A1 May 24, 2018

(30) Foreign Application Priority Data
Apr. 10, 2015 (EP) .................................. 15275119
Apr. 10, 2015 (GB) .................................. 1506089

(51) Int. Cl.
G01C 3/08 (2006.01)
G01S 7/481 (2006.01)
(Continued)

(52) U.S. Cl.
CPC ............ *G01S 7/4817* (2013.01); *G01S 7/481* (2013.01); *G01S 17/88* (2013.01); *G02B 3/12* (2013.01)

(58) Field of Classification Search
CPC ........ G01S 17/89; G01S 17/88; G01S 7/4817; G01S 7/481; G02B 3/12
(Continued)

(56) References Cited

U.S. PATENT DOCUMENTS 4,686,605 A 8/1987 Eastlund
4,999,637 A 3/1991 Bass
(Continued)

FOREIGN PATENT DOCUMENTS

DE 10245682 A1 4/2004
WO 9428361 A1 12/1994
(Continued)

OTHER PUBLICATIONS

International Preliminary Report on Patentability of International Application No. PCTGB2016050980, dated Oct. 19, 2017, 6 pages.
(Continued)

Primary Examiner — Mark Hellner
(74) Attorney, Agent, or Firm — Maine Cernota & Rardin

(57) ABSTRACT

A computational ghost imaging apparatus comprising a first electromagnetic radiation source (100) and a control system configured to cause electromagnetic radiation from said first source to be applied to a selected plurality of three-dimensional portions of an atmospheric volume between a second electromagnetic radiation source (110) and object or region of interest (106) so as to heat or ionise the air within said selected portions and create an atmospheric spatial radiation modulator (108) of a specified pattern for causing said object or region of interest to be irradiated with spatially modulated electromagnetic radiation in said specified pattern, the apparatus further comprising a detector for receiving electromagnetic radiation reflected from said object or region of interest
(Continued)

(106), and a processing module for reconstructing an image of said object or region of interest using data output by said detector.

12 Claims, 5 Drawing Sheets

(51) Int. Cl.
*G01S 17/88* (2006.01)
*G02B 3/12* (2006.01)

(58) Field of Classification Search
USPC .................................................... 356/5.01
See application file for complete search history.

(56) References Cited

U.S. PATENT DOCUMENTS

| | | | |
|---|---|---|---|
| 5,041,834 | A | 8/1991 | Koert |
| 5,269,288 | A | 12/1993 | Stirbl et al. |
| 5,400,688 | A | 3/1995 | Eninger |
| 5,415,156 | A | 5/1995 | Stirbl |
| 5,593,549 | A | 1/1997 | Stirbl |
| 5,684,621 | A | 11/1997 | Downing |
| 6,111,237 | A | 8/2000 | Paustian |
| 6,377,436 | B1 | 4/2002 | Margolin |
| 7,255,062 | B1 | 8/2007 | Higman |
| 8,373,107 | B2 * | 2/2013 | Meyers ................. G02B 27/48 250/208.1 |
| 8,981,261 | B1 | 3/2015 | Tillotson |
| 9,305,378 | B1 | 4/2016 | Holmes |
| 2003/0160724 | A1 | 8/2003 | Alexoff |
| 2004/0135744 | A1 | 7/2004 | Bimber |
| 2007/0114322 | A1 | 5/2007 | Smereczniak |
| 2007/0180983 | A1 | 8/2007 | Farinella |
| 2009/0009862 | A1 | 1/2009 | Hong |
| 2009/0084252 | A1 | 4/2009 | Marquis |
| 2009/0171477 | A1 | 7/2009 | Nayfeh |
| 2010/0258708 | A1 | 10/2010 | Meyers et al. |
| 2010/0319526 | A1 | 12/2010 | Imholt |
| 2011/0001429 | A1 | 1/2011 | Davis |
| 2011/0121158 | A1 | 5/2011 | Corke et al. |
| 2013/0057151 | A1 | 3/2013 | Curry |
| 2013/0099096 | A1 | 4/2013 | Hutchin |
| 2014/0125964 | A1 | 5/2014 | Jonas |
| 2014/0176954 | A1 | 6/2014 | Scott |
| 2014/0224776 | A1 | 8/2014 | Elhadj |
| 2014/0327747 | A1 | 11/2014 | Kong |
| 2016/0097616 | A1 | 4/2016 | Weigold |
| 2017/0118545 | A1 | 4/2017 | Kuri |
| 2017/0127507 | A1 | 5/2017 | Hunt |
| 2017/0212602 | A1 | 7/2017 | Hsu |
| 2018/0084244 | A1 | 3/2018 | Colosimo |
| 2018/0088436 | A1 | 3/2018 | Colosimo |
| 2018/0095169 | A1 | 4/2018 | Blanchard |
| 2018/0128908 | A1 | 5/2018 | Blanchard |
| 2018/0143303 | A1 | 5/2018 | Colosimo |

FOREIGN PATENT DOCUMENTS

| | | | |
|---|---|---|---|
| WO | 2002056111 | A1 | 7/2002 |
| WO | 2011057342 | A1 | 5/2011 |
| WO | 2011063407 | A2 | 5/2011 |
| WO | 2013039465 | A1 | 3/2013 |

OTHER PUBLICATIONS

International Preliminary Report on Patentability of International Application No. PCTGB2016050984, dated Oct. 19, 2017, 10 pages.
International Preliminary Report on Patentability of International Application No. PCTGB2016051003, dated Oct. 19, 2017, 9 pages.
International Preliminary Report on Patentability of International Application No. PCTGB20160509673, dated Oct. 19, 2017, 8 pages.
International Preliminary Report on Patentability of Internatinal Application No. PCTGB2016050948, dated Oct. 10, 2017, 8 pages.
European Search Report of European Application No. EP15275116.0, dated Sep. 17, 2015, 7 pages.
Great Britain Search Report of Great Britain Application No. GB1506085.8, dated Oct. 21, 2015, 3 pages.
PCT Search Report for PCT Application No. PCT/GB2016/051003, dated May 24, 2016, 13 pages.
Berreman, D.W., "A Lens or Light Guide Using Convectively Distorted Thermal Gradients in Gases", Bell System Technical Journal, vol. 43, issue 4, pp. 1469-1475, Jul. 1964.
Office Action dated Jun. 18, 2020 for U.S. Appl. No. 15/564,065, 13 Pages.
International Search Report and Written Opinion of International Application No. PCT/GB2016/050948, dated Jun. 2, 2016, 12 pages.
European Search Report of European Application No. EP15275113, dated Sep. 18, 2015, 6 pages.
Great Britain Search Report of Great Britain Application No. GB1506079.1, dated Oct. 5, 2015, 3 pages.
"Atmospheric lensing. A Weapon of Selective Destruction" by Steven J. Smith, Nov. 29, 2010. https://web.archive.org/web/20101129164210/http://whale.to/b/atmospheric_lensing.html, accessed on Mar. 10, 2015.
"Can we use atmospheric lenses as telescopes?" online discussion, last comment Oct. 30, 2014, http://www.thenakedscientists.com/forum/index.php?topic=52568.0, accessed on Mar. 10, 2015.
International Search Report and Written Opinion of International Application No. PCT/GB2016/050967, dated Jun. 1, 2016, 13 pages.
Brian W. Neiswander et al: "Plasma Lens for Optical Path Difference Control", AIAA Journal, vol. 50, No. 1, Jan. 1, 2012, pp. 123-130, XP055212822.
Bejot P et al: "32TW atmospheric white-light laser", Applied Physics Letters, American Institute of Physics, vol. 90, No. 15, Apr. 10, 2007, pp. 151106-151106.
Great Britain Search Report of Great Britain Application No. GB1506081.7, dated Oct. 8, 2015, 3 pages.
European Search Report of European Application No. EP15275114, dated Sep. 17, 2015, 8 pages.
International Search Report and Written Opinion of International Application No. PCT/GB2016/050984, dated Jun. 8, 2016, 15 pages.
Anonymous: "Plasma stealth—Wikipedia, the free encyclopedia", Mar. 21, 2015, XP055245259, Retrieved from the Internet: https://en.wikipedia.org/wiki/Plasma_stealth.
Bhaskar Chaudhury et al: "Stidy and Optimization of Plasma-Based Radar Cross Section Reduction Using Three-Dimensional Computations", IEEE Transactions on Plasma Science, IEEE Service Center, Piscataway, NJ, US, vol. 37, No. 11, Nov. 1, 2009, pp. 2116-2127.
Great Britain Search Report of Great Britain Application No. GB1506199.7, dated Sep. 30, 2015, 4 pages.
European Search Report of European Application No. EP15275181, dated Jan. 28, 2016, 10 pages.
International Search Report and Written Opinion of International Application No. PCT/GB2016/050980, dated Jun. 10, 2016, 15 pages.
Anonymous: "Deflector Shield—Wookieepedia—Wikia", 1999, XP055244465, Retrieved from the internet: URL:http://starwars.wikia.com/wiki/Deflector_shield/Legends.
Great Britain Search Report of Great Britain Application No. GB1506200.3, dated Sep. 30, 2015, 5 pages.
European Search Report of European Application No. EP15275183, dated Jan. 26, 2016, 10 pages.
International Search Report and Written Opinion of International Application No. PCT/GB2016/050873, dated May 31, 2016, 13 pages.
Baris I. Erkmen: "Computational ghost imaging for remote sensing", Hournal of the Optical Society of America A, vol. 29, No. 5, May 1, 2012, pp. 782-6600, XP055219044.

(56) References Cited

OTHER PUBLICATIONS

Baoqing Sun et al: "Normalized ghost imaging", Optics Express, vol. 20, No. 15, Jul. 16, 2012, p. 16892, XP055219055.
Great Britain Search Report of Great Britain Application No. GB1506089, dated Sep. 3, 2015, 3 pages.
European Search Report of European Application No. EP15275119, dated Oct. 12, 2015, 7 pages.
Notice of Allowance for U.S. Appl. No. 15/564,065, dated Nov. 3, 2020, 9 Pages.

* cited by examiner

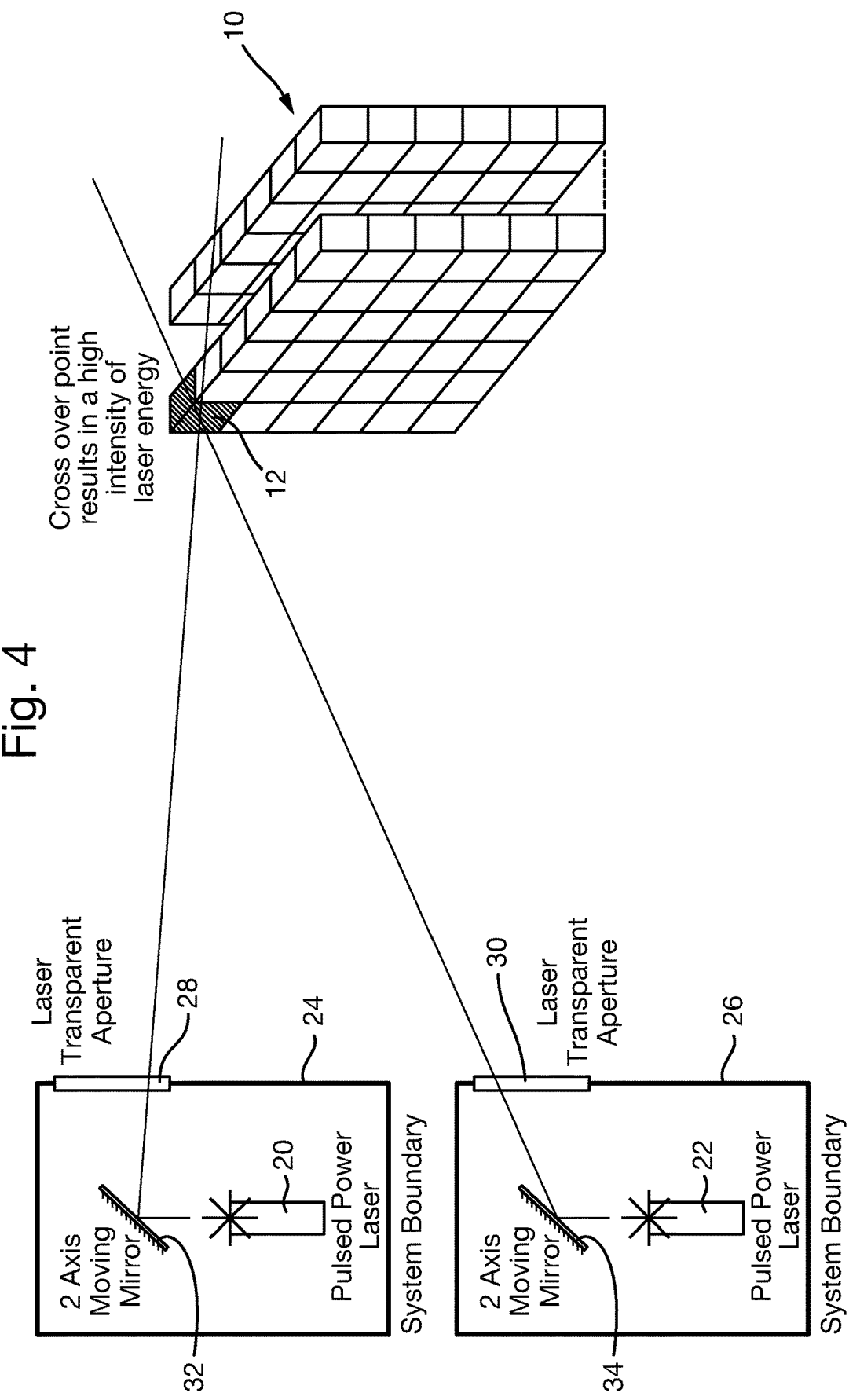

METHOD AND APPARATUS FOR COMPUTATIONAL GHOST IMAGING

RELATED APPLICATIONS

This application is a national phase application filed under 35 USC §371 of PCT Application No. PCT/GB2016/050873 with an International filing date of Mar. 29, 2016 which claims priority of GB Patent Application 1506089.0 filed Apr. 10, 2015 and EP Patent Application 152751 19.4 filed Apr. 10, 2015. Each of these applications is herein incorporated by reference in its entirety for all purposes.

FIELD OF THE INVENTION

This invention relates generally to a method and apparatus for performing computational ghost imaging which is the acquisition of object information by means of photocurrent correlation measurements.

BACKGROUND OF THE INVENTION

Most conventional imaging solutions involve light from a source (e.g. the sun) reflecting off an object and onto a detector (e.g. a focal plane array consisting of millions of detector pixels as found inside a digital camera). The spatial properties of the resultant image are a function of the focal plane array and the associated optics in front of that. Computational ghost imaging (CGI) is a novel imaging technique that has received significant attention during the last few years, and enables spatially resolved images to be recorded, as a result of which, a small, single pixel detector can be provided as a means of image sensing.

BRIEF SUMMARY OF THE INVENTION

Computational ghost imaging involves the use of a structured light source to illuminate an object or region of interest and a single pixel detector to receive the reflections. A single, low complexity device, such as a photodiode, can be used for this purpose and produce a two dimensional image of the object or region of interest, where the resulting image is a function of the level and type of illumination structure used by the illuminating system (i.e. the structured light source), and the use of a single pixel detector is considered to be highly advantageous in many applications, as it can be readily affixed or incorporated into any platform without space, weight or power issues arising.

One known type of structured light source may involve a laser and a spatial light modulator (SLM) that provides a time varying (spatially random) 'mask' through which the laser light passes and thus gains spatial information which it ultimately conveys to the object or region of interest and then, by reflection, to the single pixel detector. The single pixel detector system can only output a single value corresponding to a particular time interval, but if the illumination 'mask' being used at a given time is known, then it is possible to reconstruct the two dimensional image from a larger number of these single values (iterations of the illumination-detect cycle).

Figure 1:
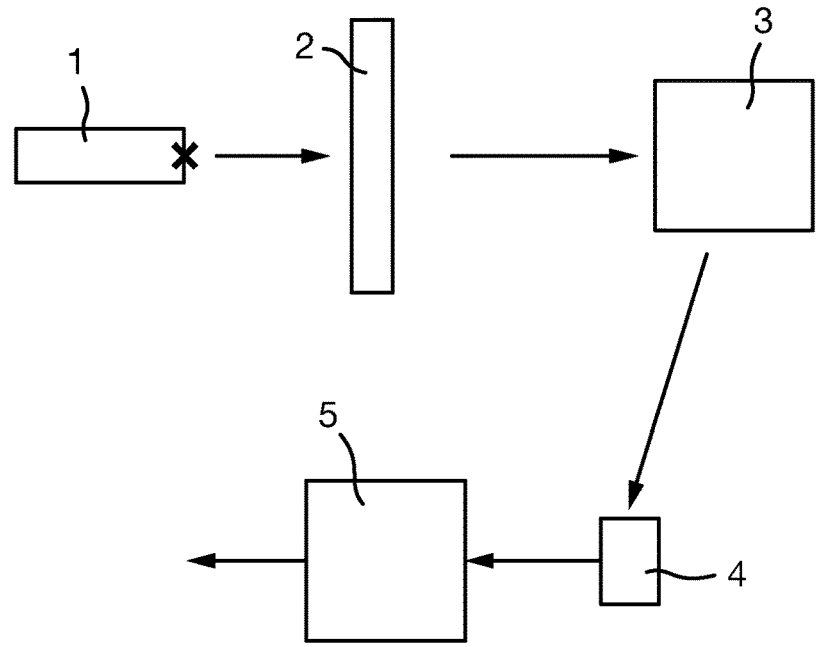
Referring to FIG. 1 of the drawings, there is illustrated schematically a spatial light modulator ghost-imaging apparatus, comprising a continuous wave (CW) laser source 1 and a spatial light modulator (SLM) 2. Spatially modulated laser light is used to illuminate an object 3 of interest and light reflected from the object 3 is captured by a single pixel detector 4, such as a photodiode or the like. It will be appreciated that, whilst the illumination source is illustrated in FIG. 1 as being in relatively close proximity to the object 3 of interest, this is not essential for the operation of the system itself. Indeed, the illumination source and single pixel detector 4 can, in theory, be spatially separated by significant distances. Detected signals from the detector 4 are fed to a correlator 5, which also receives data representative of the illumination pattern of the object at any given time (this may be provided in the form of a reference signal or otherwise). The correlator 5 is configured to apply a CGI algorithm to reconstruct the images. CGI algorithms are known in the art, and a skilled person will be familiar with these.

Whilst computational ghost imaging provides a promising alternative to conventional imaging systems, there are a number of drawbacks involved. Firstly, although CGI would be highly beneficial for airborne applications, such as wildlife and landscape photography performed by small manned aircraft or UAVs, the additional weight and power overhead created by the need for a laser source and spatial light modulator is often prohibitive. Furthermore, focal plane arrays are relatively expensive and the greater the resolution (i.e. the more detector pixels that are required, the more expensive the focal plane becomes. There is also a physical upper limit to the number of pixel detectors that can be fitted onto a single array of a specified size.

It is an object of aspects of the present invention to address at least some of these issues.

In accordance with an aspect of the present invention, there is provided a computational ghost imaging apparatus comprising a first electromagnetic radiation source and a control system configured to cause electromagnetic radiation from said source to be applied to a selected plurality of three-dimensional portions of an atmospheric volume located between a second electromagnetic radiation source and an object or region of interest so as to ionise the air within said selected portions and create an atmospheric spatial radiation modulator of a specified pattern for causing said object or region of interest to be irradiated with spatially modulated second electromagnetic radiation in said specified pattern, the apparatus further comprising a detector for receiving spatially modulated second electromagnetic radiation reflected from said object or region of interest, and a processing module for reconstructing an image of said object or region of interest using data output by said detector.

The specified pattern may be a pattern of individually ionised and non-ionised portions of said atmospheric volume, which pattern is known and may be substantially uniform, but is more likely to be random (although known, once generated).

The first electromagnetic radiation source may comprise one or more lasers.

In an exemplary embodiment of the present invention, the control system may be configured to periodically alter said specified pattern of said atmospheric spatial radiation modulator by changing the selected portions of said atmospheric volume to which said electromagnetic radiation is applied, and data representative of each specified pattern and a time interval associated therewith is provided to said processing module.

The detector, which may be a single pixel detector, and processing module are located remotely from said first electromagnetic radiation source and control system.

The apparatus may further comprise a beam steering mechanism for selectively steering a beam of electromagnetic radiation output from said first electromagnetic radiation source, said control system being communicably coupled to said beam steering mechanism and configured to generate signals for steering said beam of electromagnetic radiation relative to said atmospheric volume so as to sequentially apply electromagnetic radiation to said selected portions of said atmospheric volume. Alternatively, or in addition, the apparatus may comprise a beam splitting module for splitting a beam output from said first electromagnetic radiation source into a plurality of paths corresponding to respective locations of selected portions.

Aspects of the present invention extend to a control system for apparatus as described above, configured to cause electromagnetic radiation from said first source to be applied to a selected plurality of three-dimensional portions of an atmospheric volume between a second electromagnetic radiation source and an object or region of interest so as to ionise the air within said selected portions and create an atmospheric spatial radiation modulator of a specified pattern for causing said object or region of interest to be irradiated with spatially modulated electromagnetic radiation in said specified pattern, periodically alter said specified pattern of said atmospheric spatial radiation modulator by changing the selected portions of said atmospheric volume to which said electromagnetic radiation from said first source is applied, and provide data representative of each specified pattern and a time interval associated therewith to said processing module.

In accordance with another aspect of the present invention, there is provided a method of creating atmospheric spatial radiation modulators for use in a computational ghost imaging apparatus, the method comprising applying electromagnetic radiation from a first electromagnetic radiation source to a selected plurality of three-dimensional portions of an atmospheric volume located between a second electromagnetic radiation source and an object or region of interest so as to ionise the air within said selected portions and create a specified pattern of ionised and non-ionised portions for causing said object or region of interest to be irradiated with spatially modulated second electromagnetic radiation in said specified pattern, and periodically changing said specified pattern of ionised and non-ionised portions of said atmospheric volume to create respective spatial radiation modulators of different specified patterns associated with specified time intervals.

The atmospheric volume may be divided into an array of three dimensional portions, and the method may include the step of sequentially applying said electromagnetic radiation to said selected portions within said array.

In all cases, the second electromagnetic radiation source may comprise one or more light sources and the or each spatial radiation modulator may comprise a spatial light modulator of a specified pattern for causing said object or region of interest to be irradiated with spatially modulated light in said specified pattern.

Figure 2:
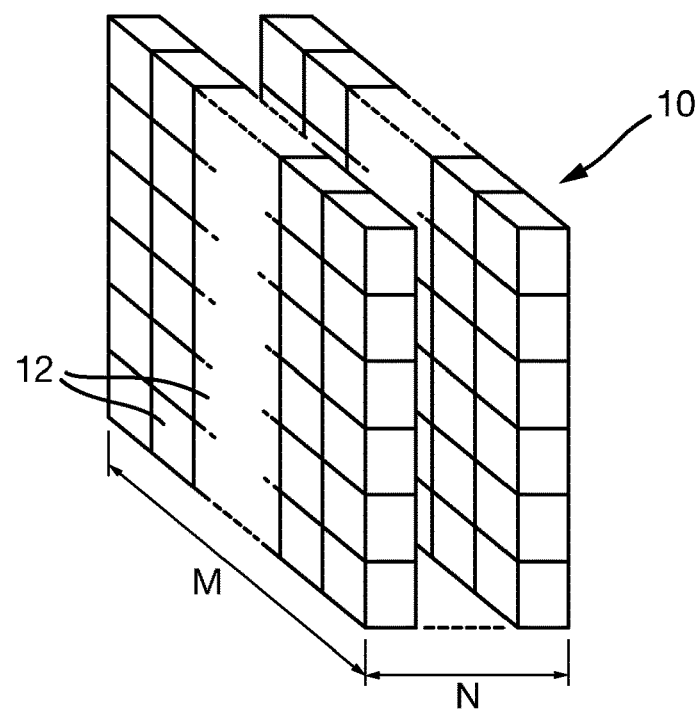
Figure 3:
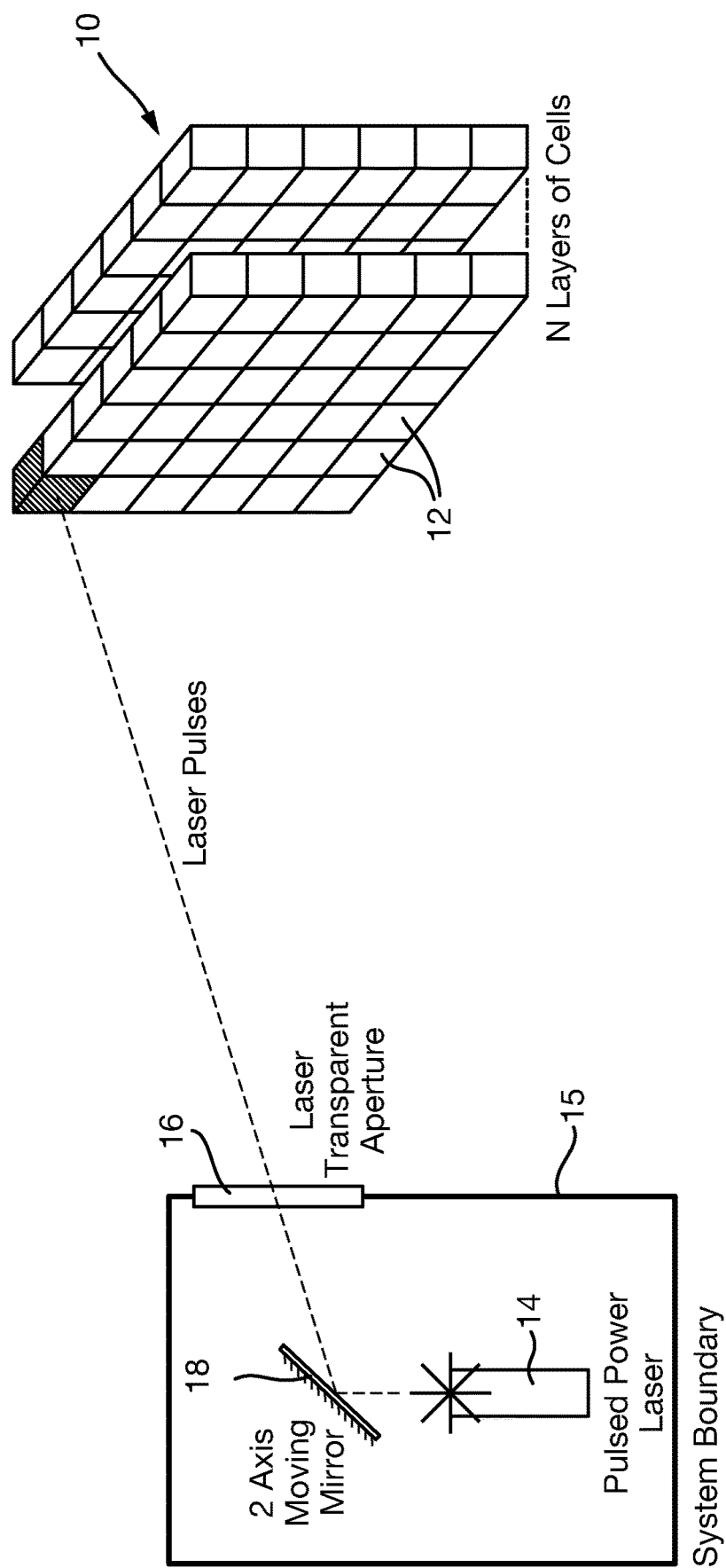
Figure 5A:
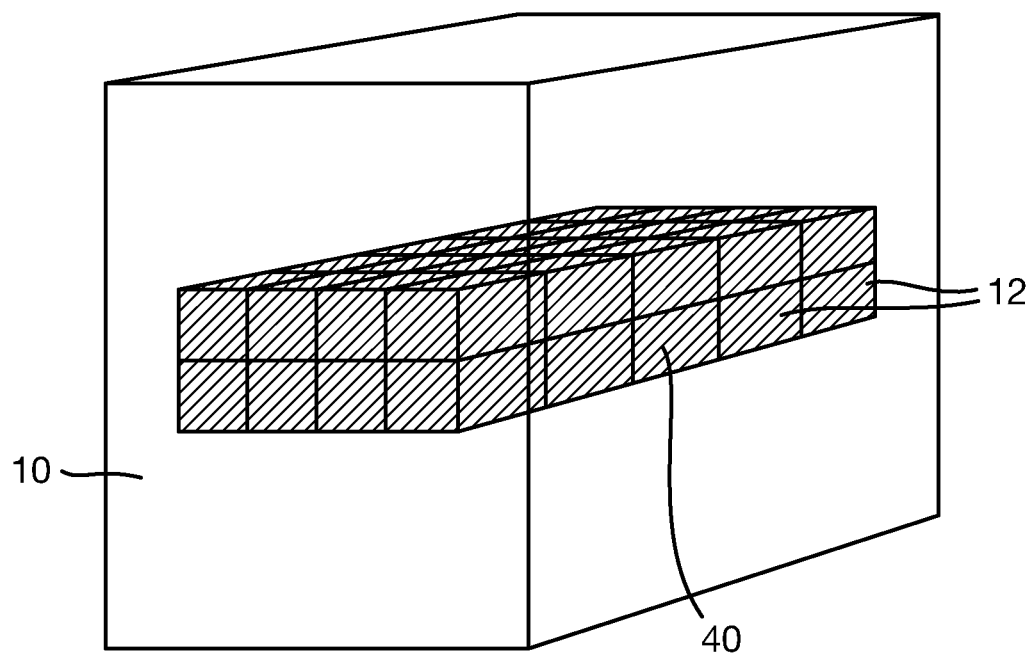
Figure 5B:
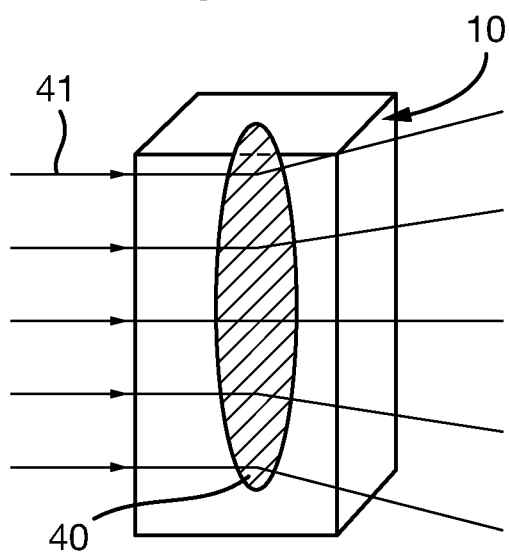
Figure 5C:
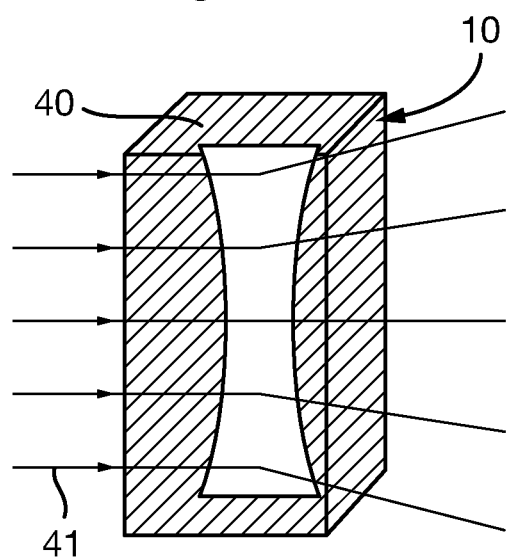
Figure 6:
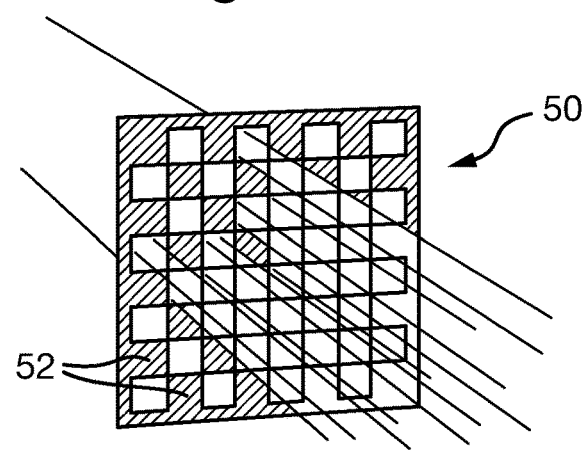
Figure 7:
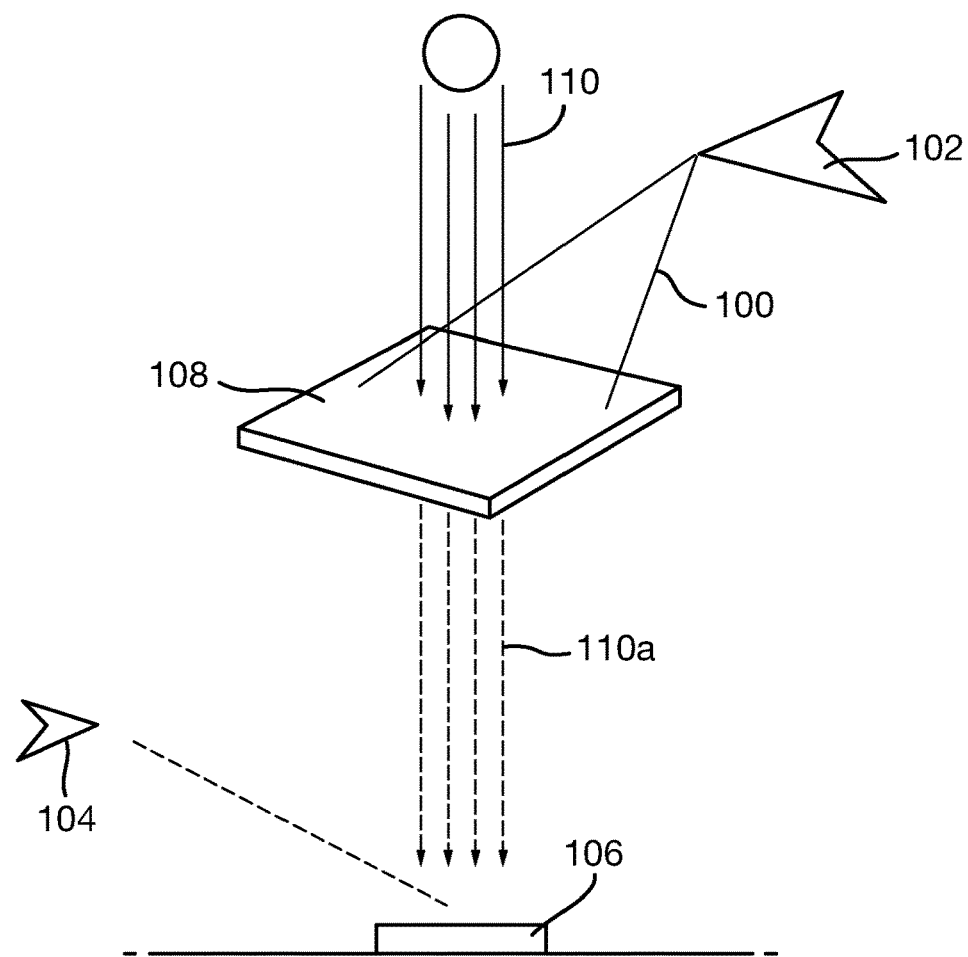

These and other aspects of the present invention will be apparent from the following specific description in which embodiments of the invention are described, by way of examples only, and with reference to the accompanying drawings, in which:

FIG. 1 is a schematic block diagram of a computational ghost imaging system according to the prior art;

FIG. 2 is a schematic diagram illustrating the concept of an M by N cell matrix for the purposes of defining an atmospheric volume within which an atmospheric spatial light modulator may be created for use in a computational ghost imaging apparatus according to an exemplary embodiment of the present invention;

FIG. 3 is a schematic diagram illustrating a manner in which laser power may be applied to selected cells within a matrix to create an atmospheric spatial light modulator for use in a computational ghost imaging apparatus according to an exemplary embodiment of the present invention;

FIG. 4 is a schematic diagram illustrating an alternative manner in which laser power may be applied to selected cells within a matrix to create an atmospheric spatial light modulator for use in a computational ghost imaging apparatus according to an exemplary embodiment of the present invention;

FIG. 5A is a schematic diagram illustrating a planar atmospheric reflective element that can be created using the principles employed in an apparatus and method according to an exemplary embodiment of the present invention;

FIGS. 5B and 5C are schematic diagrams illustrating an atmospheric diverging lens that can be created using the principles employed in an apparatus and method according to an exemplary embodiment of the present invention;

FIG. 6 is a schematic diagram illustrating the configuration of an atmospheric spatial light modulator created using a method according to an exemplary embodiment of the present invention; and FIG. 7 is a schematic diagram illustrating computational ghost imaging apparatus according to an exemplary embodiment of the present invention.

DETAILED DESCRIPTION OF THE INVENTION

Thus, aspects of the present invention operate on the principle of using one or more laser devices to selectively cause heating or ionisation of portions of a three-dimensional area of the atmosphere so as to create or simulate a spatial light modulator (SLM) of a desired size and known configuration for use in computational ghost imaging systems.

In general, and referring to FIG. 2 of the drawings, the area of the atmosphere in which a SLM is required to be created can be considered as a cell matrix 10 comprised of M rows and N columns or layers of 'cells' 12, wherein a cell is simply a predefined three-dimensional portion of the matrix. In the example shown, each cell is identical in size and shape, but this is not essential, and the present invention is not necessarily intended to be limited in this regard. It will be appreciated that the number of cells in the vertical dimension of the cell matrix may vary. Thus, the cell matrix may be of any desired size, shape and number of cells.

Within the matrix 10, the three dimensional structure of a SLM can be defined in terms of a number of cells in a desired configuration, and it is these cells that will then be targeted by the laser source in order to effect the desired change in their respective properties.

It is known that if an electric field of a sufficiently high power is applied to a volume of air, the air may be ionised. Ionised air has reflective properties. Thus, aspects of the principles employed in the present invention operate on the principle that by ionising a volume of air, it may be caused to reflect a beam of electromagnetic radiation as it hits that volume, in a manner similar to a mirror or similarly reflective device.

It is also known that an increase in temperature of a volume of air causes a corresponding decrease in the density of that volume of air. As a result, the refractive index of warm air is lower than that of cooler (and therefor denser) air. Thus, some aspects of the present invention operate on the principle that by providing a volume of air that is warmer than the air around it, that volume of air can cause refraction of a beam of electromagnetic radiation as it passes through, in a manner similar to convergent or divergent lens.

Thus, referring back to FIG. 2 of the drawings, it will be appreciated that by selectively heating or ionising cells 12 within the remote matrix 10, a three-dimensional SLM can be created and dynamically changed using a high power electromagnetic radiation source. This may be achieved in a number of different ways. For example, a pulsed power laser (PPL) may be employed, and the 'Kerr' effect exploited therewith in order to attain self focussing of the laser beam at a required point (i.e. within the selected cell). Alternatively, a combination (i.e. crossing over) of two continuous wave (CW) laser beams at a required point may be used to achieve the desired effect. Either way, the lasers are configured to selectively heat or ionise the remote atmosphere region, thus either causing the selected cells to be heated and changing their refractive index, or causing ionisation of the selected cells and, thereby, causing them to become reflective or deflecting in some way.

Referring to FIG. 3 of the drawings, apparatus used to effect one exemplary embodiment of the present invention comprises at least one laser source 14 mounted in an enclosure 15. In the example shown, the laser source 14 is a pulsed power laser source configured to emit high power laser pulses toward the remote cell matrix 10 via a laser transparent aperture 16. An optically reflective device, i.e. mirror, 18 is mounted on a dual-axis actuator (not shown) in the main laser output path, the actuator being communicably coupled with a control system that is configured to cause the actuator (and, therefore, the mirror 18) to move, thereby to selectively direct the laser output through the aperture 16 toward selected cells 12 of the matrix 10 (beam steering). The control system may, for example, be configured to cause the laser output to be scanned across the cell matrix providing a pulse (or more than one pulse) to each selected cell, either via a raster pattern or a pattern optimised to suit the application and/or the operational requirements of the available equipment.

As mentioned briefly above, the laser pulse is effectively self-focussing by means of the 'Kerr' effect, thereby enabling it to deliver enough concentrated power to ionise the cell at which it is directed. The Kerr effect is a change in the refractive index of a material in response to an applied electric field. In the case of a laser pulse of sufficiently high power, its electric field is sufficiently high to change the refractive index of the air. As a result, the cross-sectional area of the pulse (perpendicular to the direction of propagation) can be thought of as shrinking with distance (due to the differences in refractive index), thus bringing the pulse to an intense focus at some point down range of the laser, in this case the selected cell. This intense focus is of sufficiently high intensity to heat or ionise the cell. One or more pulses may be provided per cell, dependent on the to desired effect and environmental conditions.

Referring to FIG. 4 of the drawings, apparatus that may be used in an alternative exemplary embodiment of the present invention, may comprise two CW (continuous wave) laser sources 20, 22 mounted within respective enclosures 24, 26, each having a laser transparent aperture 28, 30 therein. Once again, each laser system is provided with a mirror 32, 34 mounted on a dual-axis actuator (not shown) communicably coupled to a control system (not shown). Operation of the system is similar, in principle, to that described previously with reference to FIG. 3 of the drawings except, in this case, two (or more) spatially separated CW lasers (which may be mounted on the same platform or across different platforms) are used to selectively heat or ionise the atmosphere in each required remote cell. This is achieved by ensuring (through pointing or accurate beam steering) that the laser beams cross over at the same point (in the selected cell 12), thereby ensuring that sufficient power is attained. Such scanning may be performed on the basis of a control system configured to maintain a predetermined spatial separation and orientation between the atmospheric component and the electromagnetic radiation source. However, in an alternative exemplary embodiment, such scanning may be performed using a control system configured to direct the source(s) at specific coordinates corresponding to specific respective absolute locations within the atmosphere.

In yet another exemplary embodiment, and either in addition to the above-mentioned arrangements or alternatively, it is envisaged that a beam splitter could be employed to split a laser beam into numerous new paths corresponding to the configuration of a plurality of respective cells to be targeted. Thus, a plurality of such remote cells could be targeted simultaneously, without the need for scanning a single laser path across the remote cell matrix.

It will be understood that the cell matrix 10 is arranged remote from the laser source 15 or laser sources 24 and 26 and that the cell matrix 10 may be formed in orientations suitable for the application of the SLM formed in cell matrix such that orientations other than normal to the path of the laser source 15 or laser sources 24 and 26 can be provided for SLM formed in the cell matrix.

Referring to FIG. 5A of the drawings, in its simplest form, the principles described above may be employed to create an atmospheric planar mirror 40, which can be oriented at any required angle within the atmospheric volume defined by a cell matrix 10. The mirror 40 is created by applying a laser source in the manner described above to each of the cells 12 that are together configured to form the desired mirror 'shape'.

Referring to FIG. 5B of the drawings, exemplary embodiments of the invention may use an atmospheric diverging lens. The illustrated lens 40 is of a double convex lens configuration and, in the example shown, has been created generally centrally within the cell matrix 10 with its longitudinal axis in line with the generally central vertical axis of the matrix 10. In order to create the lens 40, the cells corresponding to the three-dimensional 'structure' of a double convex lens are heated, for example, using one of the methods described above, thereby to reduce the refractive index of those cells relative to the surrounding cells, and cause the rays of an incoming beam 41 of electromagnetic radiation to be refracted as they enter the component 40 and diverge. For the avoidance of doubt, it will be appreciated that the atmospheric component 40 is a three-dimensional area within the cell matrix comprised of a plurality of atmospheric cells, each of which has been heated in order to attain the required refractive index.

In an alternative exemplary embodiment, a diverging lens may be created by heating the cells surrounding a three dimensional configuration of cells in the shape of a double concave lens (similar in form to that of a conventional diverging lens). Thus, the resultant atmospheric element would comprise a concave lens-shaped region of unheated cells surrounded by a body of heated cells, as shown in FIG. 5C of the drawings (wherein the shaded area 40 denotes the heated cells and the double concave lens region is unheated).

In the cases described above with reference to FIGS. 5B and 5C of the drawings, the refractive index of the heated cells forming the lens structure is substantially constant, and the differing EM radiation path modifying properties are achieved by the geometry or orientations of the component. In other words, as with a physical component, it is just the geometry of the three dimensional volume of heated cells (or unheated cells) that defines the function of the resultant lens.

A control system and any number of lasers may be employed to ensure that the correct amount of laser power is applied to each cell in order to attain the required level of heating (or ionisation in relation to the aforementioned case described with reference to FIG. 3 or 4 of the drawings), having regard to environmental factors and the refractive index change required to be achieved. When the component is no longer required, the laser power can simply be removed, and the atmospheric cells will quickly return to their normal state.

In a known computational ghost imaging system, and referring to FIG. 6 of the drawings, the SLM 50 may comprise one or more planar arrays of optically reflective or opaque devices 52, for example, metamaterial absorbers or digital micromirror devices, which can be individually dynamically configured to be transmissive to an incoming light source or opaque thereto. Thus, the 'mask' that the light source 'sees' is a pixelated pattern of transmissive and opaque portions. A control system is provided which is configured to change that pattern, by manipulating or adjusting the metamaterial absorbers or micromirror devices so as to alter the configuration of transmissive and opaque portions for each time interval. The time intervals are necessarily short, of the order of microseconds, in order to ensure that the quality of the image eventually reconstructed is adequate.

Referring now to FIG. 7 of the drawings, a computational ghost imaging apparatus according to an exemplary embodiment of the present invention, there is provided a laser source 100, in this case provided on a first airborne platform 102. Also mounted within the first airborne platform 102, is a control system (not shown) for controlling the operation of the laser source 100 both in terms of output and beam steering. In the example shown, a second airborne platform 104, remote from the first platform 102, is provided with one or more single pixel detectors (not shown). The measurements obtained by the single pixel detector may be transmitted to a remote location (either to the first to airborne platform 102 or elsewhere, for example, a ground station (not shown) for processing, although in some exemplary embodiments, the image processing means may be provided in or on the same platform as the single pixel detector.

The control system for the laser source 100 includes a database in which is stored data representative of a plurality of SLM configurations corresponding to respective patterns of opaque and transmissive portions of a cell matrix. In use, when it is required to obtain an image of an object 106 of interest, a processor within the control system retrieves a first SLM configuration and generates actuation signals for the laser source 100. The actuation signals include beam steering signals for steering the laser source so as to point the beam at each selected cell in a cell matrix nominally defined within the atmosphere between the platform 102 and the object 106 of interest, thereby to ionise the selected cells to generate the remote cell matrix in the desired orientation. The actuation signals also include data representative of the power and time of the laser pulse required. Thus, the actuation signals cause the laser source to create a first atmospheric SLM 108 between the platform 102 and the object 106, wherein the atmospheric SLM 108 comprises a plurality of reflective cells, arranged in a known (uniform or random) pattern. After a predetermined time interval, the processor retrieves the next SLM configuration in a sequence from the database, and the above-mentioned process is repeated to create a second atmospheric SLM corresponding to the next time interval. This process is then repeated for a plurality of further time intervals and corresponding SLM configurations, until the imaging process is complete. It will be appreciated that, if the platform 102 on which the principal laser source 100 is mounted is moving relative to the object 106 of interest, or the object of interest is moving relative to the principal laser source, then it will be necessary to provide a tracking module for tracking the relative movement between the two, and adjusting the location of creation of the SLMs to take such movement into account and ensure that the object 106 of interest is consistently illuminated with the required structure light pattern. When the laser source is removed from the atmospheric volume, the cells therein will relatively quickly return to their normal state.

In an alternative exemplary embodiment of the present invention, the control system for the laser source 100 once again includes a database in which is stored data representative of a plurality of SLM configurations, but in this case they correspond to respective patterns of divergent and transmissive portions of a cell matrix. In use, when it is required to obtain an image of an object 106 of interest, a processor within the control system retrieves a first SLM configuration and generates actuation signals for the laser source 100. The actuation signals include beam steering/splitting signals for steering or otherwise directing the laser source so as to point the beam at each selected cell in a cell matrix nominally defined within the atmosphere between the platform 102 and the object 106 of interest, thereby to heat the selected cells. The actuation signals also include data representative of the power and time of the laser pulse required. Thus, the actuation signals cause the laser source to create a first atmospheric SLM 108 between the platform 102 and the object 106, wherein the atmospheric SLM 108 comprises a plurality of atmospheric diverging lenses, arranged in a known (uniform or random) pattern. After a predetermined time interval, the processor retrieves the next SLM configuration in a sequence from the database, and the above-mentioned process is repeated to create a second atmospheric SLM corresponding to the next time interval. This process is then repeated for a plurality of further time intervals and corresponding SLM configurations, until the imaging process is complete. It will be appreciated that, if the platform 102 on which the principal laser source 100 is mounted is moving relative to the object 106 of interest, or the object of interest is moving relative to the principal laser source, then it will be necessary to provide a tracking module for tracking the relative movement between the two, and adjusting the location of creation of the SLMs to take such movement into account and ensure that the object 106 of interest is consistently illuminated with the required structure light pattern. When the laser source is removed from the atmospheric volume, the cells therein will relatively quickly return to their normal state.

Solar, lunar or other electromagnetic energy 110, whether natural (e.g. from starlight) or from a man-made source, passes through each atmospheric SLM 108 and illuminates the object 106 of interest with a structured pattern of light 110a corresponding to the time interval associated with the respective SLM configuration. Data representative of the SLM configuration (or the resultant structured pattern of light) and the time interval to which it relates is transmitted to, or otherwise known by, the image processing system.

The single pixel detector mounted on the remote platform 104 receives light reflected from the object 106 of interest, and a single measurement for each mask is sufficient for processing purposes. The image processing system receives such measurements and creates a multiplexed two-dimensional image of the object 106 by correlating the known spatial information from the captured signals. The multiplexed image can then be fully reconstructed using any known CGI algorithm, for example, an inverse Hadamard transform.

Furthermore, an atmospheric element monitoring system may be provided within, or communicably coupled to, the control system. The atmospheric element monitoring system may, for example, comprise a low power laser of a suitable wavelength (as will be apparent to a person skilled in the art) to detect atmospheric effects. Thus, the monitoring system may form part of a feedback loop with the control system processor to enable the actuation signals to be adjusted to compensate for atmospheric distortion. In alternative exemplary embodiments, the apparatus may comprise a quality monitoring module for monitoring the performance (i.e. the properties and characteristics) of the atmospheric element against a predefined set of desired criteria, and generating signals to dynamically adjust beam steering and/or power of the electromagnetic radiation source so as to reduce or eliminate deviation of the properties and characteristics of the atmospheric element from that which is defined by the predefined criteria. Such deviation may be caused by atmospheric distortion or otherwise. In other words, successive and/or continuous 'fine tuning' of the atmospheric element is facilitated to create and maintain an atmospheric element having consistently desired characteristics and quality.

It will be appreciated that the principles described herein can be used in many different configurations of CGI apparatus, and the relative locations of the principal laser source, the control system, the single pixel detector and the image processing system are not fixed.

It will be apparent to a person skilled in the art from the foregoing description that modifications and variations can be made to the described embodiments without departing from the scope of the invention as defined by the appended claims. For example, whilst the specific embodiments described above relate specifically to visible electromagnetic radiation, i.e. light, and spatial light modulation, the present invention is equally applicable for use with other types of electromagnetic radiation and, in such cases, the spatial modulator may be referred to herein as a spatial radiation modulator having a specified patter and configured to cause said object or region of interest to be irradiated with spatially modulated electromagnetic radiation in said specified pattern.

The invention claimed is:

1. A computational ghost imaging apparatus comprising a first electromagnetic radiation source and a control system configured to cause electromagnetic radiation from said first source to be applied to a selected plurality of three-dimensional portions of an atmospheric volume located between a second electromagnetic radiation source and an object or region of interest so as to heat or ionise the air within said selected portions and create an atmospheric spatial radiation modulator of a specified pattern for causing said object or region of interest to be irradiated with spatially modulated second electromagnetic radiation in said specified pattern, the apparatus further comprising a detector for receiving spatially modulated second electromagnetic radiation reflected from said object or region of interest, and a processor for reconstructing an image of said object or region of interest using data output by said detector.

2. The apparatus according to claim 1, wherein said specified pattern is a pattern of individually ionised and non-ionised portions of said atmospheric volume.

3. The apparatus according to claim 1, wherein said specified pattern is defined by a pattern of atmospheric diverging lenses, wherein said diverging lenses comprise one or more heated portions of said atmospheric volume.

4. The apparatus according to claim 2, wherein said pattern is random.

5. The apparatus according to claim 1, wherein said first electromagnetic radiation source comprises one or more lasers.

6. The apparatus according to claim 1, wherein said control system is configured to periodically alter said specified pattern of said atmospheric spatial radiation modulator by changing the selected portions of said atmospheric volume to which said electromagnetic radiation is applied, and data representative of each specified pattern and a time interval associated therewith is provided to said processor.

7. The apparatus according to claim 1, wherein said detector and processor are located remotely from said first electromagnetic radiation source and control system.

8. The apparatus according to claim 1, further comprising a beam steering mechanism selectively steering a beam of electromagnetic radiation output from said first electromagnetic radiation source, said control system being communicably coupled to said beam steering mechanism and configured to generate signals for steering said beam of electromagnetic radiation relative to said atmospheric volume so as to sequentially apply electromagnetic radiation to said selected portions of said atmospheric volume.

9. The apparatus according to claim 1, comprising a beam splitter for splitting a beam output from said first electromagnetic radiation source into a plurality of paths corresponding to respective locations of selected portions of said atmospheric volume.

10. The apparatus according to claim 1, wherein said second electromagnetic radiation source comprises one or more light sources, and said spatial radiation modulator comprises a spatial light modulator for causing said object or region of interest to be irradiated with spatially modulated light in said specified pattern.

11. A control system for apparatus according to claim 1, configured to cause electromagnetic radiation from said first source to be applied to a selected plurality of three-dimensional portions of an atmospheric volume between a second electromagnetic radiation source and an object or region of interest so as to heat or ionise the air within said selected portions and create an atmospheric spatial radiation modulator of a specified pattern for causing said object or region of interest to be irradiated with spatially modulated second electromagnetic radiation in said specified pattern, periodically alter said specified pattern of said atmospheric spatial radiation modulator by changing the selected portions of said atmospheric volume to which said electromagnetic radiation is applied, and provide data representative of each specified pattern and a time interval associated therewith to said processor.

12. The control system according to claim 11, wherein said second electromagnetic radiation source comprises one or more light sources, and said spatial radiation modulator comprises a spatial light modulator of a specified pattern for causing said object or region of interest to be irradiated with spatially modulated light in said specified pattern.

* * * * *